No. 846,577. PATENTED MAR. 12, 1907.
H. D. LAUGHLIN.
SIDE BEARING FOR CARS.
APPLICATION FILED DEC. 18, 1906.
3 SHEETS—SHEET 1.
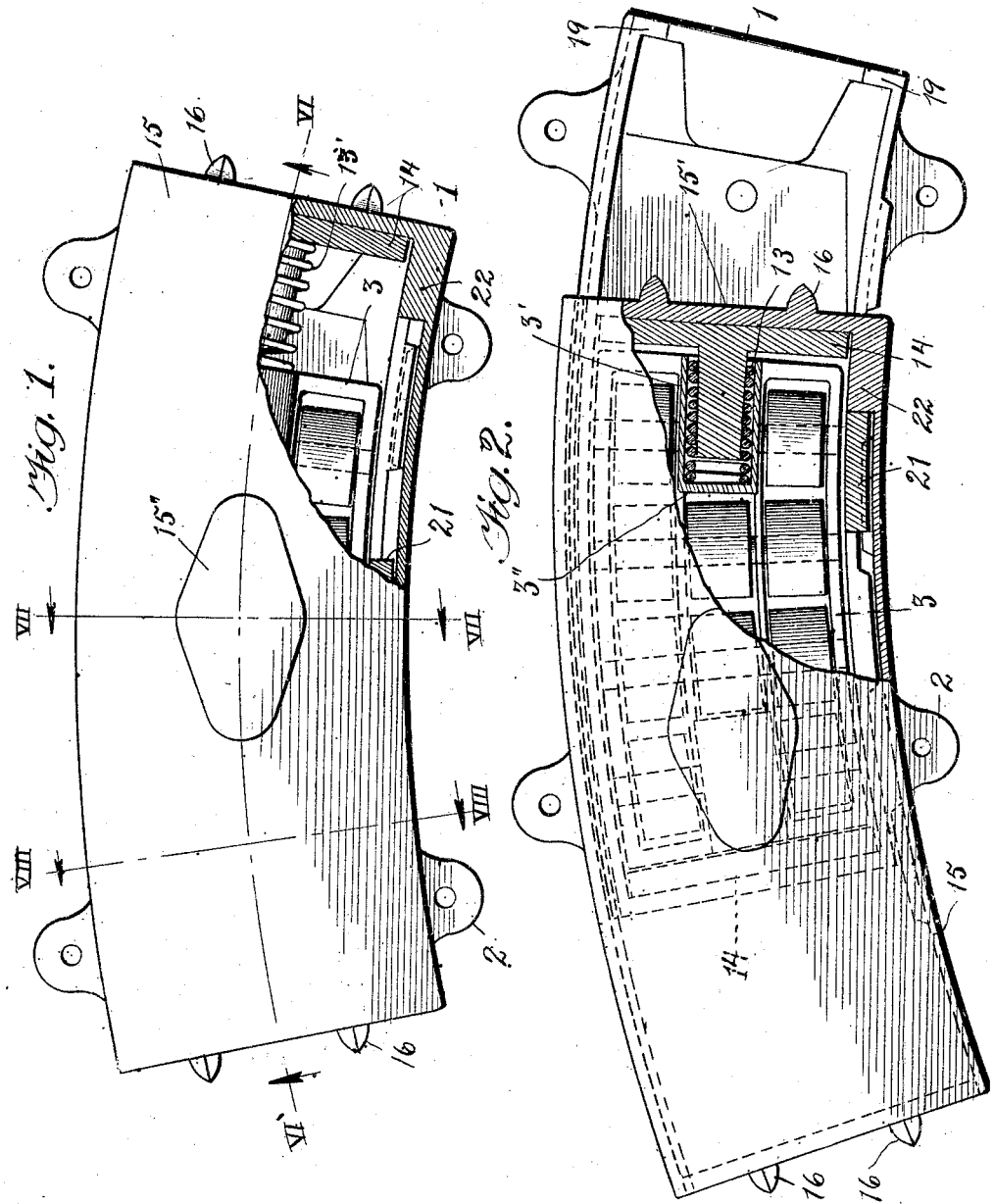
Witnesses:
J. C. Bird.
Robert H. Weir
Inventor:
Henry D. Laughlin,
By Albert H. Graves
Atty No. 846,577. PATENTED MAR. 12, 1907.
H. D. LAUGHLIN.
SIDE BEARING FOR CARS.
APPLICATION FILED DEC. 18, 1906.
3 SHEETS—SHEET 2.
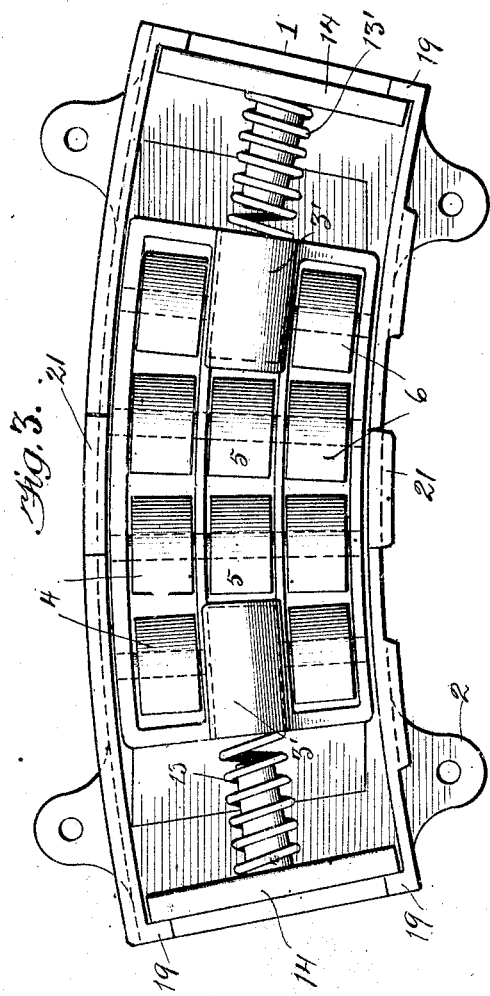
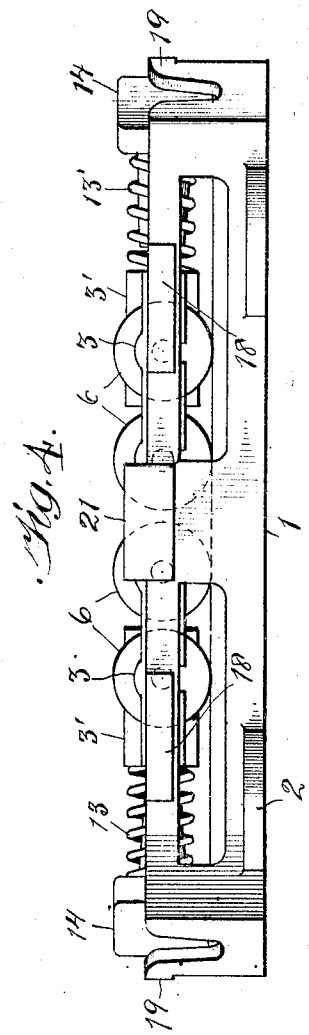

No. 846,577. PATENTED MAR. 12, 1907.
H. D. LAUGHLIN.
SIDE BEARING FOR CARS.
APPLICATION FILED DEC. 18, 1906.
3 SHEETS—SHEET 3.
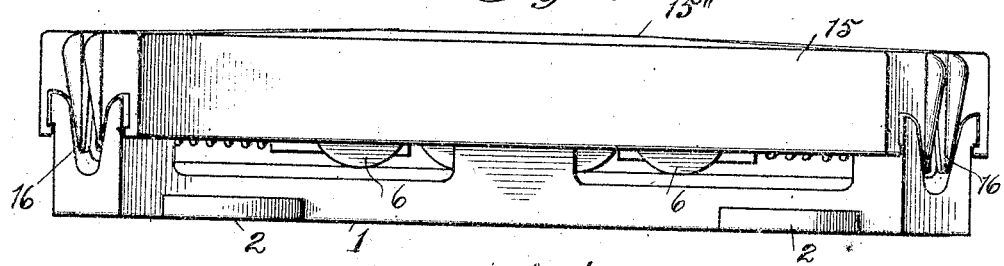
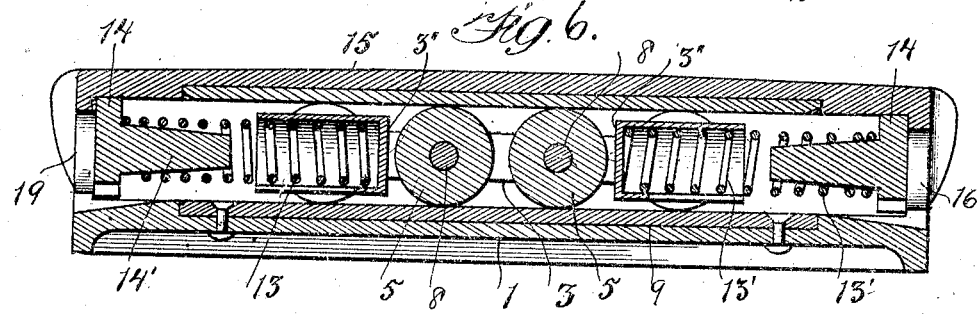
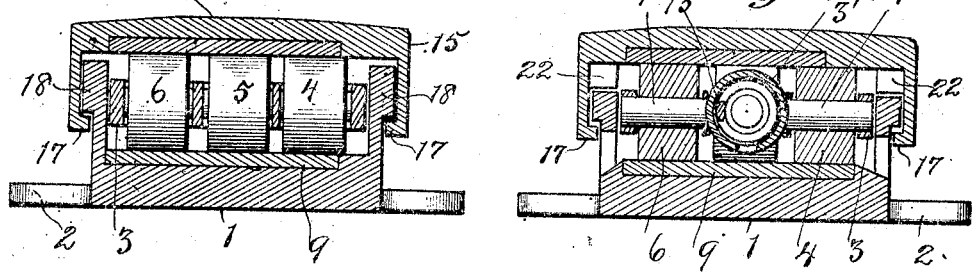
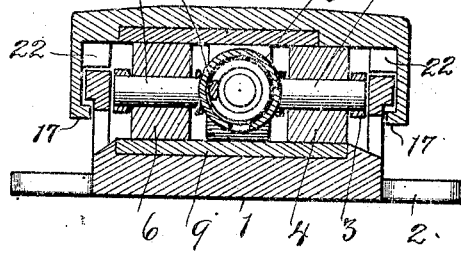
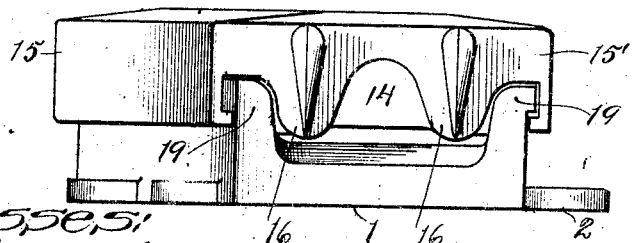
Witnesses:
J. C. Bird
Robert H. Weir
Inventor
Henry D. Laughlin,
By Albert N. Evans
Atty

UNITED STATES PATENT OFFICE.

HENRY D. LAUGHLIN, OF CHICAGO, ILLINOIS.

SIDE BEARING FOR CARS.

No. 846,577.   Specification of Letters Patent.   Patented March 12, 1907.

Application filed December 18, 1906. Serial No. 348,410.

*To all whom it may concern:*

Be it known that I, HENRY D. LAUGHLIN, a citizen of the United States, residing at Chicago, in the county of Cook and State of Illinois, have invented certain new and useful Improvements in Side Bearings for Cars, of which the following is a specification.

This invention relates to improvements in car side bearings of the antifriction type, and has for its object to improve the construction of side bearings of the general type referred to in my prior patent, No. 722,995, dated March 17, 1903.

In a side bearing of the general type having a rolling top bearing-plate any sudden thrust brought upon the same, as when rounding a sharp curve, is liable to cause breakage of certain weaker parts of the bearing. The particular object of the present invention is to so limit the movement of the top bearing-plate that any extreme stress will be sustained by the stronger parts, and thereby diverted from the weaker parts.

The invention consists in the matters hereinafter described, and more particularly pointed out in the appended claims, and that the invention may be fully understood reference is to be had to the accompanying drawings, in which—

Figure 1 is a plan view of a side bearing embodying my invention, partly broken away and showing the top plate in its normal central position. Fig. 2 is a similar view showing the top plate as moved beyond one end of the bearing-box. Fig. 3 is a plan view of the bearing complete with exception of the top plate. Fig. 4 is a side elevation of the same. Fig. 5 is a side elevation with the top bearing member in position. Fig. 6 is a vertical sectional view taken on curved line VI VI of Fig. 1. Fig. 7 is a transverse section taken on line VII VII of Fig. 1. Fig. 8 is a transverse section taken on line VIII VIII of Fig. 1; and Fig. 9 is an end elevation of the bearing, the parts being at normal.

The general construction of the bearing is like that shown and described in my said prior patent and will not therefore be described in detail.

In the drawings, 1 designates as a whole a box-like base member provided at either end with suitable lugs 2 2, whereby it is bolted to the top of a truck-bolster, said base member having the form of an open-topped oblong and approximately rectangular box, curved, however, throughout its length to the arc of oscillation of that part of the bolster on which it is mounted. Within said base member is arranged a roller-carriage 3, constructed to receive a plurality of longitudinal series of roller elements 4, 5, and 6, the two outer sets preferably each comprising four rollers, while the intermediate set comprises two rollers only. The roller elements are mounted on shafts 7 8, mounted in the carriage 3 and extending radially with respect to the center bearing of the truck, and in order that the carriage may travel naturally in the curved path described the several roller elements are made slightly tapering.

The carriage and the top bearing-plate are automatically centered with respect to the bearing-box by means of two helical expansion-springs 13 13', one at each end of the carriage, as shown. To receive the springs, sockets 3', having ends or bottoms 3'', are cast in the ends of the carriage 3. Loosely arranged within the end walls 15' of the top bearing member 15 are two abutment-plates 14, provided with cylindric inward extensions 14', fitting loosely within the springs. The top plate 15 is movable independently of said abutment-plates, as hereinafter explained. Said plates 14 are constructed to fit easily at their ends between the side walls of the bearing-box, and in order that they shall be actuated (one at a time) by the top bearing-plate 15 the latter is provided at each end with depending lugs 16, which overlap the outer surfaces of the respective abutment-plates 14. The top plate 15 is made coextensive with the bearing-box and is provided upon its sides with inwardly-projecting confining-flanges 17, which underlie the outwardly-projecting flanges 18. upon the sides of the bearing-box, as shown in Fig. 7, whereby the top plate is held against lifting up, while free to reciprocate upon the former. The end walls of the base portion of the bearing-box are provided with upstanding lugs 19, which serve to arrest and limit the movement of the spring-plates 14 when the top bearing member is shifted, and also tend to arrest both the carriage and the top plate when the latter assume their centered positions. The top plate 15 is provided centrally with an elevated, preferably flattened, upper surface 15'', which serves to distribute the load more evenly over the roller elements, as clearly described in my prior patent.

It will be understood from the foregoing that the top bearing-plate 15 is so interconnected with the roller-carriage on which it is mounted through the medium of the abutment-plates 14 and the springs that its movement in either direction will compress both of the springs, and one of its ends will move beyond or into overhanging relation with the base or fixed bearing member 1.

In side bearings of certain prior constructions when the top plate has been moved forward or back to the end of its travel the springs are fully compressed—that is to say, their coils are in solid contact—and hence the shocks or blows are received by the ends of the spring-sockets and by the parts corresponding to the lugs 16 herein shown. An unusually severe blow of this character has broken the weaker parts of such bearings, which must then be provided with new parts. To prevent such breakage of parts, I provide extensions of the base member itself, which limit the travel of the top plate at points where the springs will be almost, but not fully, compressed. Applying this principle I provide the sides of the base member, close to their upper edges, with centrally-positioned upwardly and outwardly projecting stop-lugs 21, as clearly shown in Figs. 3 and 4. These lugs are cast integral with the base member and are sufficiently long and heavy to withstand the longitudinal blows of the top bearing member, which is constructed as follows: For coöperation with said lugs 21 the sides of the top member 15 are thickened interiorly at their ends and provided with stop-shoulders 22, said thickened portions being of such length that when the springs are almost fully compressed two of the stops 22 will strike the lugs 21, thus arresting the movement of the top plate, protecting the weaker parts from the blow and transferring the same to the base member without, however, in any way detracting from the efficiency of the bearing as a whole. In the reverse movement of the top plate the other pair of stop-shoulders 22 operate to limit the movement of the plate by engagement with said lugs 21.

It is to be observed that the location of the lugs 21 is mid-length of the bearing, and the longitudinal width of these lugs is such that considered with reference to the location of the coöperating lugs 22 at the respective ends of the stop-plate they properly limit the movements of the latter in both directions. However, independent sets of stops 21 might be provided and located otherwise than mid-length of the bearing; but the construction shown is preferred.

It will be understood that when the top bearing-plate is shifted by the action of the car-body thereon one of the abutment-plates 14 will be drawn with and in the same direction as the top plate, but the other abutment-plates 14 will be retained by the end of the base member, as indicated by dotted lines in Fig. 2. In other words, said abutments are free to be pushed inwardly or toward the center of the bearing, but not outwardly beyond the ends of the bearing-base. As one of the abutment-plates is pushed inwardly by the movement of the top bearing member one of the springs will be compressed between that plate and the more slowly moving roller-carriage, while the other spring will also be compressed between the opposite end of said carriage and the opposite abutment-plate. When the displacing force is removed from the bearing, the springs by expanding restore the carriage and the top member to normal position.

It will be obvious that the details of construction may be modified without departing from the invention, and, moreover, that the invention is not limited to the specific type of side bearing described herein.

I claim as my invention—

1. In a side bearing for cars, a recessed base member, an antifriction device movable longitudinally within said base, coiled springs for centering said antifriction device, a bearing-plate mounted upon the latter, operative connections between the ends of said bearing-plate and said springs, a centrally-located stop upon the side of said base member, and stops upon the ends of the sides of the bearing-plate, said bearing-plate stops being arranged to impinge upon the first-named stop and thereby protect the operative connections before either of said springs shall have been fully compressed.

2. In a side bearing for cars, a box-like base member, an antifriction device longitudinally movable therein, helical springs for centering said antifriction device, movable abutments normally held between the outer ends of said springs and the end walls of the base member, a bearing-plate mounted upon said antifriction device, the ends of said bearing-plate being provided with laterally-positioned stops, a centrally-located stop integral with the side wall of the base member and projecting upwardly and outwardly, said stop being arranged to receive the thrust of the stops upon said bearing-plate before either of said springs shall have been fully compressed by movement of said bearing-plate.

3. In a side bearing for cars, a box-like base member the longitudinal sides of which are each provided with a central, upwardly and outwardly projecting stop-lug, an antifriction device movable longitudinally within said base, a top bearing-plate mounted upon said antifriction device for longitudinal motion, the sides of the top bearing-plate overhanging the sides of said base member, stop-lugs projecting inwardly from the sides of the top plate at the ends thereof, loosely-mounted abutment-plates within the respective ends of the top bearing-plate, springs interposed between said plates and the ends of the antifriction device, stops upon the base member for limiting the outward motion of said plates; said inwardly-projecting lugs of the top bearing-plate being so positioned as to impinge upon said centrally-located lugs of the base member before either of said springs shall have become fully compressed.

4. In a side bearing for cars, a box-like base member the longitudinal sides of which are each provided with a central, upwardly and outwardly projecting stop-lug, an antifriction device longitudinally movable within said base, a top bearing member consisting of a plate having downwardly-projecting or overhanging sides and end portions, stop-lugs projecting inwardly from the end portions of said overhanging sides, loosely-mounted abutment-plates within the respective ends of said top bearing member, compression-springs lying between said abutment-plates and said antifriction device, and stops upon the ends of the base member for limiting the outward movement of the abutment-plates; said stop-lugs of the ends of the top bearing member being so positioned as to impinge upon said stop-lugs of the base member before full compression of said springs.

5. In a side bearing for cars, a base member, an antifriction device movable longitudinally upon said base, one or more centering-springs acting upon said antifriction device to center the latter relatively to the base, a bearing-plate traversing the antifriction device, and rigid stop-shoulders upon the bearing-plate and base member, respectively, arranged to positively limit the longitudinal traverse of the plate in each direction.

HENRY D. LAUGHLIN.

Witnesses:
ALBERT H. GRAVES,
EMILIE ROSE.